United States Patent
Hannigan et al.

(10) Patent No.: US 7,711,144 B2
(45) Date of Patent: May 4, 2010

(54) WATERMARKING EMPLOYING THE TIME-FREQUENCY DOMAIN

(75) Inventors: Brett T. Hannigan, Philadelphia, PA (US); Kenneth L. Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 12/030,135

(22) Filed: Feb. 12, 2008

(65) Prior Publication Data

US 2008/0181449 A1   Jul. 31, 2008

Related U.S. Application Data

(63) Continuation of application No. 10/753,984, filed on Jan. 5, 2004, now Pat. No. 7,330,562, which is a continuation of application No. 09/661,900, filed on Sep. 14, 2000, now Pat. No. 6,674,876.

(51) Int. Cl.
*G06K 9/00* (2006.01)

(52) U.S. Cl. .................................. 382/100; 704/205

(58) Field of Classification Search .................. 382/100, 382/232, 233, 254; 704/205; 380/54
See application file for complete search history.

(56) References Cited

U.S. PATENT DOCUMENTS

| | | | |
|---|---|---|---|
| 3,845,391 A | 10/1974 | Crosby | |
| 4,225,967 A | 9/1980 | Miwa et al. | |
| 4,313,197 A | 1/1982 | Maxemchuk | |
| 4,333,113 A | 6/1982 | Kalinowski | |
| 4,358,857 A | 11/1982 | Gleason et al. | |
| 4,425,642 A | 1/1984 | Moses et al. | |
| 4,425,661 A | 1/1984 | Moses et al. | |
| 4,495,620 A | 1/1985 | Steele et al. | |
| 4,528,588 A | 7/1985 | Lofberg | |
| 4,703,476 A | 10/1987 | Howard | |
| 4,939,515 A | 7/1990 | Adelson | |
| 4,943,973 A | 7/1990 | Werner | |
| 4,963,998 A | 10/1990 | Maufe | |
| 4,979,210 A | 12/1990 | Nagata et al. | |
| 5,010,405 A | 4/1991 | Schreiber et al. | |
| 5,113,437 A | 5/1992 | Best et al. | |
| 5,146,457 A | 9/1992 | Veldhuis et al. | |

(Continued)

FOREIGN PATENT DOCUMENTS

EP   0058482   8/1982

(Continued)

OTHER PUBLICATIONS

Bender, "Techniques for Data Hiding," SPIE vol. 2420, 1995, pp. 164-173.

(Continued)

*Primary Examiner*—Duy M Dang (57) ABSTRACT

Methods and systems for watermarking of signals employ time frequency analysis. An encoding method divides the signal into segments, transforms each segment into a time-frequency representation, and computes a time-frequency domain watermark signal based on the time frequency representation. It then combines the time-frequency domain watermark signal with the media signal to produce a watermarked media signal. To embed a message using this method, one may use peak modulation, pseudorandom noise modulation, statistical feature modulation, etc. Watermarking that uses a time-frequency representation enables the encoder to adapt and or derive the modifications made to embed data based on the time frequency representation.

21 Claims, 7 Drawing Sheets

U.S. PATENT DOCUMENTS

| | | | |
|---|---|---|---|
| 5,161,210 | A | 11/1992 | Druyvesteyn et al. |
| 5,319,735 | A | 6/1994 | Preuss et al. |
| 5,355,161 | A | 10/1994 | Bird et al. |
| 5,404,377 | A | 4/1995 | Moses |
| 5,410,541 | A | 4/1995 | Hotto |
| 5,450,490 | A | 9/1995 | Jensen et al. |
| 5,579,124 | A | 11/1996 | Aijala et al. |
| 5,612,943 | A | 3/1997 | Moses et al. |
| 5,613,004 | A | 3/1997 | Cooperman et al. |
| 5,636,292 | A | 6/1997 | Rhoads |
| 5,642,397 | A | 6/1997 | Agbaje-Anozie |
| 5,646,997 | A | 7/1997 | Barton |
| 5,649,054 | A | 7/1997 | Oomen et al. |
| 5,687,191 | A | 11/1997 | Lee et al. |
| 5,712,920 | A | 1/1998 | Spille |
| 5,764,763 | A | 6/1998 | Jensen et al. |
| 5,768,426 | A | 6/1998 | Rhoads |
| 5,774,452 | A | 6/1998 | Wolosewicz |
| 5,787,334 | A | 7/1998 | Fardeau et al. |
| 5,822,360 | A | 10/1998 | Lee et al. |
| 5,828,325 | A | 10/1998 | Wolosewicz et al. |
| 5,832,119 | A | 11/1998 | Rhoads |
| 5,850,481 | A | 12/1998 | Rhoads |
| 5,893,067 | A | 4/1999 | Bender et al. |
| 5,915,027 | A | 6/1999 | Cox et al. |
| 5,930,369 | A | 7/1999 | Cox et al. |
| 5,933,798 | A | 8/1999 | Linnartz |
| 5,940,135 | A | 8/1999 | Petrovic et al. |
| 5,945,932 | A | 8/1999 | Smith et al. |
| 6,026,193 | A | 2/2000 | Rhoads |
| 6,061,793 | A | 5/2000 | Tewfik et al. |
| 6,078,664 | A | 6/2000 | Moskowitz et al. |
| 6,122,392 | A | 9/2000 | Rhoads |
| 6,185,312 | B1 * | 2/2001 | Nakamura et al. .......... 382/100 |
| 6,205,249 | B1 | 3/2001 | Moskowitz |
| 6,208,735 | B1 | 3/2001 | Cox et al. |
| 6,233,347 | B1 | 5/2001 | Chen et al. |
| 6,266,430 | B1 | 7/2001 | Rhoads |
| 6,272,176 | B1 | 8/2001 | Srinivasan |
| 6,330,335 | B1 | 12/2001 | Rhoads |
| 6,353,672 | B1 | 3/2002 | Rhoads |
| 6,363,159 | B1 | 3/2002 | Rhoads |
| 6,370,272 | B1 | 4/2002 | Shimizu |
| 6,400,827 | B1 | 6/2002 | Rhoads |
| 6,404,898 | B1 | 6/2002 | Rhoads |
| 6,427,012 | B1 | 7/2002 | Petrovic |
| 6,449,379 | B1 | 9/2002 | Rhoads |
| 6,483,927 | B2 | 11/2002 | Brunk et al. |
| 6,512,837 | B1 | 1/2003 | Ahmed |
| 6,526,385 | B1 | 2/2003 | Kobayashi et al. |
| 6,539,095 | B1 | 3/2003 | Rhoads |
| 6,542,618 | B1 | 4/2003 | Rhoads |
| 6,542,620 | B1 | 4/2003 | Rhoads |
| 6,571,144 | B1 | 5/2003 | Moses et al. |
| 6,614,914 | B1 | 9/2003 | Rhoads et al. |
| 6,631,198 | B1 | 10/2003 | Hannigan et al. |
| 6,647,129 | B2 | 11/2003 | Rhoads |
| 6,654,480 | B2 | 11/2003 | Rhoads |
| 6,674,876 | B1 | 1/2004 | Hannigan et al. |
| 6,675,146 | B2 | 1/2004 | Rhoads |
| 6,718,047 | B2 | 4/2004 | Rhoads |
| 6,778,682 | B2 | 8/2004 | Rhoads |
| 6,845,360 | B2 | 1/2005 | Jensen |
| 6,862,355 | B2 | 3/2005 | Kolessar |
| 6,871,180 | B1 | 3/2005 | Neuhauser et al. |
| 6,915,001 | B2 | 7/2005 | Tachibana et al. |
| 6,944,298 | B1 | 9/2005 | Rhoads |
| 6,983,051 | B1 | 1/2006 | Rhoads |
| 7,006,555 | B1 | 2/2006 | Srinivasan |
| 7,006,655 | B2 | 2/2006 | Taniguchi et al. |
| 7,113,614 | B2 | 9/2006 | Rhoads |
| 7,181,022 | B2 | 2/2007 | Rhoads |
| 7,206,649 | B2 | 4/2007 | Kirovski et al. |
| 7,330,562 | B2 | 2/2008 | Hannigan et al. |
| 7,369,678 | B2 | 5/2008 | Rhoads |
| 7,536,555 | B2 | 5/2009 | Rhoads |
| 7,567,686 | B2 | 7/2009 | Rhoads |
| 2002/0006203 | A1 | 1/2002 | Tachibana et al. |
| 2004/0028222 | A1 | 2/2004 | Sewell et al. |
| 2005/0177361 | A1 * | 8/2005 | Srinivasan .................. 704/205 |
| 2006/0062386 | A1 | 3/2006 | Rhoads |
| 2006/0109984 | A1 | 5/2006 | Rhoads |
| 2008/0131083 | A1 | 6/2008 | Rhoads |
| 2008/0270801 | A1 | 10/2008 | Levy et al. |
| 2009/0067672 | A1 | 3/2009 | Rhoads |
| 2009/0097702 | A1 | 4/2009 | Rhoads |
| 2009/0136085 | A1 | 5/2009 | Rhoads |

FOREIGN PATENT DOCUMENTS

| | | |
|---|---|---|
| EP | 0493091 | 7/1992 |
| EP | 0629972 | 12/1994 |
| EP | 0565947 | 5/1997 |
| GB | 2196167 | 4/1998 |
| JP | 4-248771 | 9/1992 |
| WO | WO 89/08915 | 9/1989 |
| WO | WO 95/14289 | 5/1995 |
| WO | WO 95/20291 | 7/1995 |
| WO | WO 96/27259 | 9/1996 |
| WO | WO98/53565 | 11/1998 |
| WO | WO00/00969 | 1/2000 |

OTHER PUBLICATIONS

Tachibana et al., "An Audio Watermarking Method Robust Against Time- and Frequency-Fluctuation," Security and Watermarking of Multimedia Contents III, Proc. of SPIE vol. 4314 (2001) SPIE pp. 104-115.

Moller et al., "Rechnergestutzte Steganographie: Wie sie funktioniert and warum folglich jede Reglementierung von Verschlusselung unsinnig ist," Datenschutz and Datensicherung, vol. 18, No. 6, 1994, pp. 318-326 (with English Translation).

Boneh, "Collusion-Secure Fingerprinting for Digital Data," Dept. of Computer Science, Princeton University (31 pages), 1995.

Oomen et al., "A Variable-Bit-Rate Buried Data Channel for Compact Disc," Journal of the Audio Engineering Soc., vol. 43 No. 1-2 pp. 23-28, Jan./Feb. 1995.

Ten Kate, W.R., et al., "A New Surround-Stereo-Surround Coding Technique", J. Audio Eng. Soc., vol. 40, No. 5, May 1992, pp. 376-383.

"Simultaneous subliminal signalling in conventional sound circuits: a feasibility study," BBC Research Department Report No. 1971/1, Dated Jan. 1971.

P.C.J. Hill, "Simultaneous Subliminal Signalling in Conventional Sound Circuits," BBC Engineering, No. 90, pp. 14-31, 1972.

Namba, S. et al., "A Program Identification Code Transmission System Using Low-Frequency Audio Signals," NHK Laboratories Note, U.S. Appl. No. 314, Mar. 1985.

Steele, R. et al., "Embedding Data in Speech using Scrambling Techniques," IEEE International Conference on Acoustics, Speech and Signal Processing, vol. 3, May 1982.

Steele, R. et al., "Simultaneous Transmission of Speech and Data Using Code-Breaking Techniques," The Bell System Tech. Jour., vol. 60, No. 9, pp. 2081-2105, Nov. 1981.

ten Kate, et al., "Digital Audio Carrying Extra Information," Philips Research Labs, pp. 1097-1100, IEEE 1990.

* cited by examiner

Time Frequency Analysis
of Audio Signal

WATERMARKING EMPLOYING THE TIME-FREQUENCY DOMAIN

APPLICATION DATA

This patent application is a continuation of U.S. patent application Ser. No. 10/753,984, filed Jan. 5, 2004 (Now U.S. Pat. No. 7,330,562), which is a continuation of Ser. No. 09/661,900, filed Sep. 14, 2000 (now U.S. Pat. No. 6,674,876), which are hereby incorporated by reference.

This patent application is related to application Ser. No. 09/503,881, filed Feb. 14, 2000 (now U.S. Pat. No. 6,614,914); and Ser. No. 09/596,658, filed Jun. 19, 2000 (now U.S. Pat. No. 6,631,198), which are hereby incorporated by reference.

FIELD OF THE INVENTION

The invention relates to digital watermarks and more particularly to watermarking media signals using time-frequency representations.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's U.S. Pat. Nos. 6,614,914 and 5,862,260, which are hereby incorporated by reference.

This document describes methods and systems for time-frequency domain watermarking of media signals, such as audio and video signals. One of these methods divides the media signal into segments, transforms each segment into a time-frequency spectrogram, and computes a time-frequency domain watermark signal based on the time frequency spectrogram. It then combines the time-frequency domain watermark signal with the media signal to produce a watermarked media signal. To embed a message using this method, one may use peak modulation, pseudorandom noise modulation, statistical feature modulation, etc. Watermarking in the time-frequency domain enables the encoder to perceptually model time and frequency attributes of the media signal simultaneously.

Another watermark encoding method divides at least a portion of the media signal into segments and processes each segment as follows. It moves a window along the media signal in the segment and repeatedly applies a frequency transform to the media signal in each window to generate a time-frequency representation. It computes a perceptually adaptive watermark in the time-frequency domain, converts the watermark signal to the time domain using an inverse frequency transform and repeats the process until each segment has been processed. Finally, it adds the watermark signal to the media signal to generate a watermarked media signal.

A method for decoding the watermark from the media signal transforms the media signal to a time frequency representation, computes elements of a message signal embedded into the media signal from the time frequency representation, and decodes a message from the elements. The elements may be message signal elements of an antipodal, pseudorandom noise based watermark, or message signal elements of some other type of watermark signal, such as statistical feature modulation signal, peak modulation signal, echo modulation signal, etc.

One embodiment of a watermark decoder includes a detector for determining whether a watermark is present in the media signal and determining an alignment and scale of the watermark. It also includes a reader for decoding an auxiliary message embedded in a time frequency representation of the media signal.

One aspect of the invention is a method of watermarking an audio signal. The method performs frequency transformations of blocks of audio to produce frequency domain representations of the blocks. The method then forms a two dimensional representation of the audio from the frequency domain representations. This is sometimes referred to as a time frequency representation or spectrogram of the audio. The method provides an auxiliary data signal to be embedded in the audio signal. Finally, the method modifies the two dimensional representation of the audio according to the auxiliary data signal to embed the auxiliary data signal in the audio signal. The modifications can be computed in one domain and then adapted from application to the audio signal in another domain, such as a frequency domain, on a compressed bit stream, or in an un-compressed, time domain version of the audio signal.

Variants of the method embed the auxiliary signal be introducing modifications in the two dimensional representation that correspond to auxiliary data symbols. To enhance robustness, symbols are encoded redundantly in different frequency bands, sometimes using different embedding functions. In some variants, the modifications are adapted to the signal in the two dimensional representation. For example, one embodiment modulates peaks, while other embodiments modulate other features or statistics to correspond to embedded data.

A watermark detector method decodes the auxiliary data signal from an audio signal. The method performs frequency transformations of blocks of audio to produce frequency domain representations of the blocks, and forms a two dimensional representation of the audio from the frequency domain representations. The method analyzes the two dimensional representation of the audio signal to ascertain modifications made to encode the auxiliary data signal, and reads the auxiliary data signal from the modifications.

Further features and advantages will become apparent from the following detailed description and accompanying drawings.

DETAILED DESCRIPTION

To illustrate watermarking technology described in this document, it is helpful to start by illustrating examples of time, frequency, and time-frequency domain representations of a media signal. For the sake of illustration, the following discussion illustrates representations of an audio signal in the time, frequency, and time-frequency domains. Other time varying media signals, like video, can also be represented in the time, frequency and time frequency domains.

Figure 1:
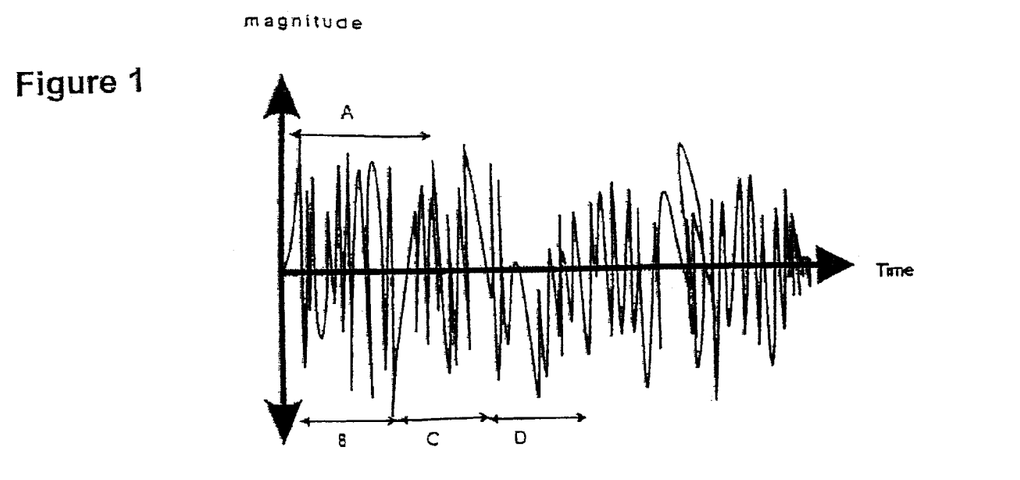
FIG. 1 illustrates an audio signal in the time domain, i.e. magnitude versus time.
Figure 2:
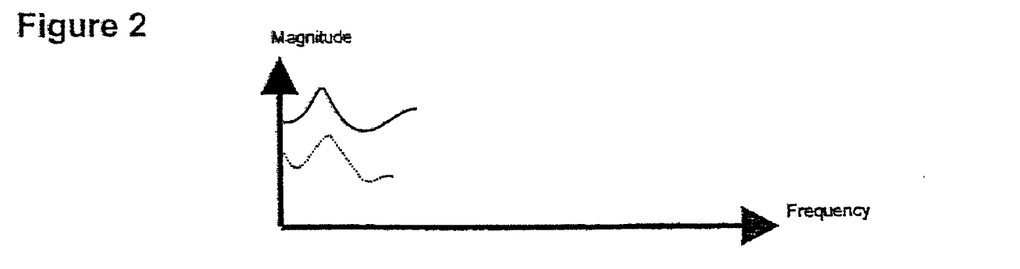
FIG. 2 illustrates an audio signal in the frequency domain, i.e. magnitude versus frequency.

An audio signal can be represented in the time domain, i.e. by a magnitude (e.g., sound pressure level) versus time curve, as shown in FIG. 1. A segment of an audio signal (such as the portion of the signal designated by the letter A in FIG. 1) can also be represented in a frequency domain (e.g., Fourier transform domain), as a plot of magnitude versus frequency as illustrated in FIG. 2.

A digital watermark can be embedded in the audio signal by modifying the signal in the frequency domain. The dotted line in FIG. 2 represents a digital watermark signal. This watermark signal can be embedded in the original signal to create a watermarked audio signal. So long as the watermark signal is about 23 db below the original signal, it will generally not be noticed by listeners (or viewers of image signals).

Figure 3A:
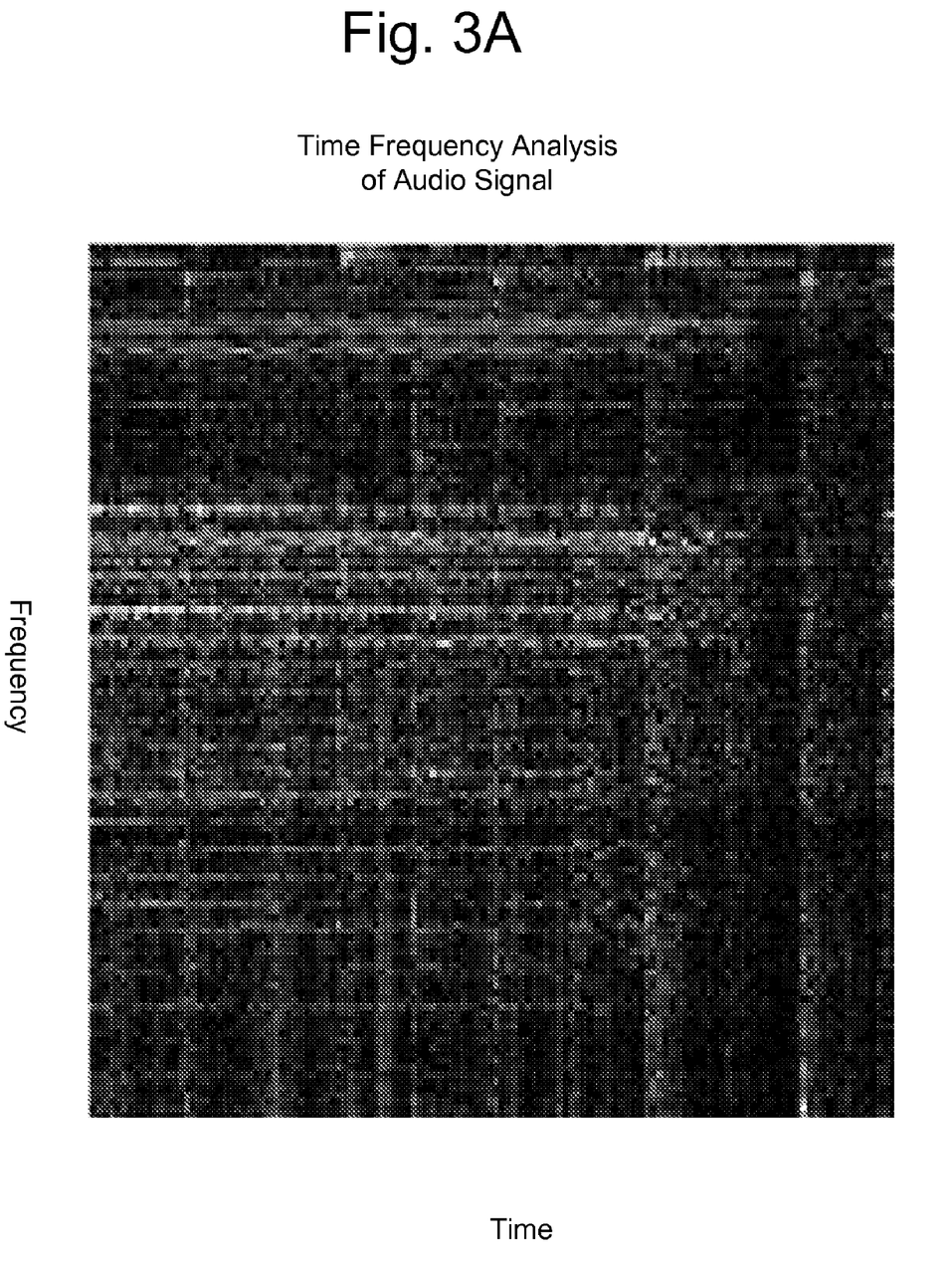
FIG. 3A illustrates an audio signal in the time-frequency domain, also known as a spectrogram of an audio signal, i.e. magnitude versus frequency versus time.

A time varying media signal, such as an audio or video signal, can also be represented in a time-frequency domain. In a time frequency representation, the signal is represented as magnitude and/or phase versus frequency versus time, as shown in FIG. 3A. In FIG. 3A, the lighter grayscale colors represent higher magnitudes while darker colors represent lower magnitudes in the time frequency representation. Some signal transformations, such as certain types of filter banks (e.g., Quadrature Mirror filters) or wavelets inherently produce time-frequency data.

A Fourier analysis, such as an FFT, may be used to create a time-frequency representation by taking the FFT of several windowed time segments of the audio signal. The segments can be temporally or spatially overlapping or non-overlapping, as long as the inverse transform takes into account the extent of the overlap, if any, to properly reconstruct the signal in the domain in which it is perceived. This re-construction process is known as overlap-and-add. The segments can also be windowed, using a Hamming or Hanning window for example, to reduce the frequency representation of the window versus the signal. In audio, time-frequency representations are sometimes referred to as spectrograms.

The following sections describe various watermark encoding and decoding methods that operate on time frequency representations of media signals. These techniques are applicable to media signals that have a temporal component, such as audio and video.

The watermark encoding methods take advantage of perceptual masking of the host media signal to hide the watermark. Time-frequency representations provide an opportunity to perform perceptual modeling based on temporal and frequency domain masking characteristics of the signal. In fact, since these representations provide both temporal and frequency information, the encoding system may perform temporal and frequency perceptual modeling simultaneously on the time-frequency representation of the media signal.

For audio signals, perceptual masking refers to a process where one sound is rendered inaudible in the presence of another sound. There are two primary categories of audio masking: simultaneous and non-simultaneous (temporal). While more complex forms of masking may exist, simultaneous masking can be classified into three groups: noise-masking tone in which a narrow band noise masks a tone within the same critical band; tone masking noise in which a pure tone occurring at the center of a critical band masks noise of any sub-critical bandwidth or shape, provided the noise spectrum is below a predictable threshold of the masking tone; and noise masking noise, in which a narrow band noise masks another narrow band noise.

Simultaneous masking is not limited to within a single critical band; rather, a masker sound within one critical band has a masking affect in other critical bands known as the spread of masking. The effect of a tone masking noise can be modeled by a triangular spreading function that has slopes of, for example, 25 and −10 dB per Bark. This enables the host audio signal to hide or mask more watermark signal on the high frequency side of a loud tone.

Non-simultaneous masking takes advantage of the phenomena that the masking effect of a sound extends beyond the time of the presentation of that sound. There is a pre-masking effect that tends to last only 1-2 milliseconds before the masker sound, and a post-masking effect that may extend anywhere from about 50 to 300 milliseconds after the masker, depending on the strength and duration of the masker. This enables the host audio signal to hide or mask more watermark signal in the temporal portion after a loud tone.

In time-frequency representation, the watermark encoder performs simultaneous and non-simultaneous masking analyses, either independently or in combination, to measure the masking capability of the signal to hide a watermark. It is worth noting that the type of masking depends on the nature of the watermark signal and watermark embedding function as illustrated further below. The encoder employs the frequency domain information to perform critical band analysis while taking into account the spreading effect. For example, the masking effect can be modeled with a function that has the following properties in the frequency dimension: a roughly triangular shaped function in the frequency dimension, where the masking effect has a maximum at a selected frequency (i.e. the frequency of the candidate masker sound), decreases drastically to lower frequencies and decreases more gradually to higher frequencies relative to the masker.

The encoder may also model temporal masking to take into account pre and post masking effects. For example, the masking effect can be modeled with a function that has the following properties in the time dimension: a function that has a maximum at the time of presentation of the masker, decreases drastically before the masker to model the premasking effect, and decreases more gradually after the masker to model the post masking effect.

The encoder also analyzes the noise-like vs. tone-like qualities of the audio signal. When the watermark is embedded by adding a noise-like pseudorandom (PN) sequence, the encoder assigns higher masking capability values to noise like signals than tone like signals. When the watermark is embedded by adding a tonal signal, the encoder assigns a lower masking capability to noise. When the watermark signal is embedded by adding a shifted version of the host signal in the time domain (e.g., a time domain echo) or time frequency domain, the host signal inherently masks the watermark signal. However, noise segments in the host signal can mask the watermark signal better (with only a −4 dB threshold per critical band) than tones can mask other tones (~−15 dB per Bark) or noise (−25 dB per critical band). In some cases, it is appropriate to assign a masking capability value of zero or nearly zero so that the encoder reduces the watermark signal to zero or nearly zero in that location of the time frequency representation of the host signal. The perceptual model also accounts for the absolute hearing threshold in determining the masking capability values. The absolute hearing threshold can be characterized as the amount of energy needed in a pure tone such that it can be detected by a listener in a noiseless environment. This threshold can be approximated by a non linear-function:

$$T(f)=3.64(f/1000)^{-0.8}-6.5e^{-0.6(f/1000-3.3)^2}+10^{-3}(f/1000)^4 (\text{dB SPL}),$$

which is representative of a young listener with acute hearing. The perceptual model for watermarking accounts for this threshold by transforming masking control values in a manner that is approximately proportional to this threshold. In particular, the gain of the watermark signal is adjusted in a manner that tracks this threshold: at frequencies where hearing is more sensitive, the watermark signal gain is lower, and at frequencies where hearing is less sensitive, the gain is higher.

Figure 3B:
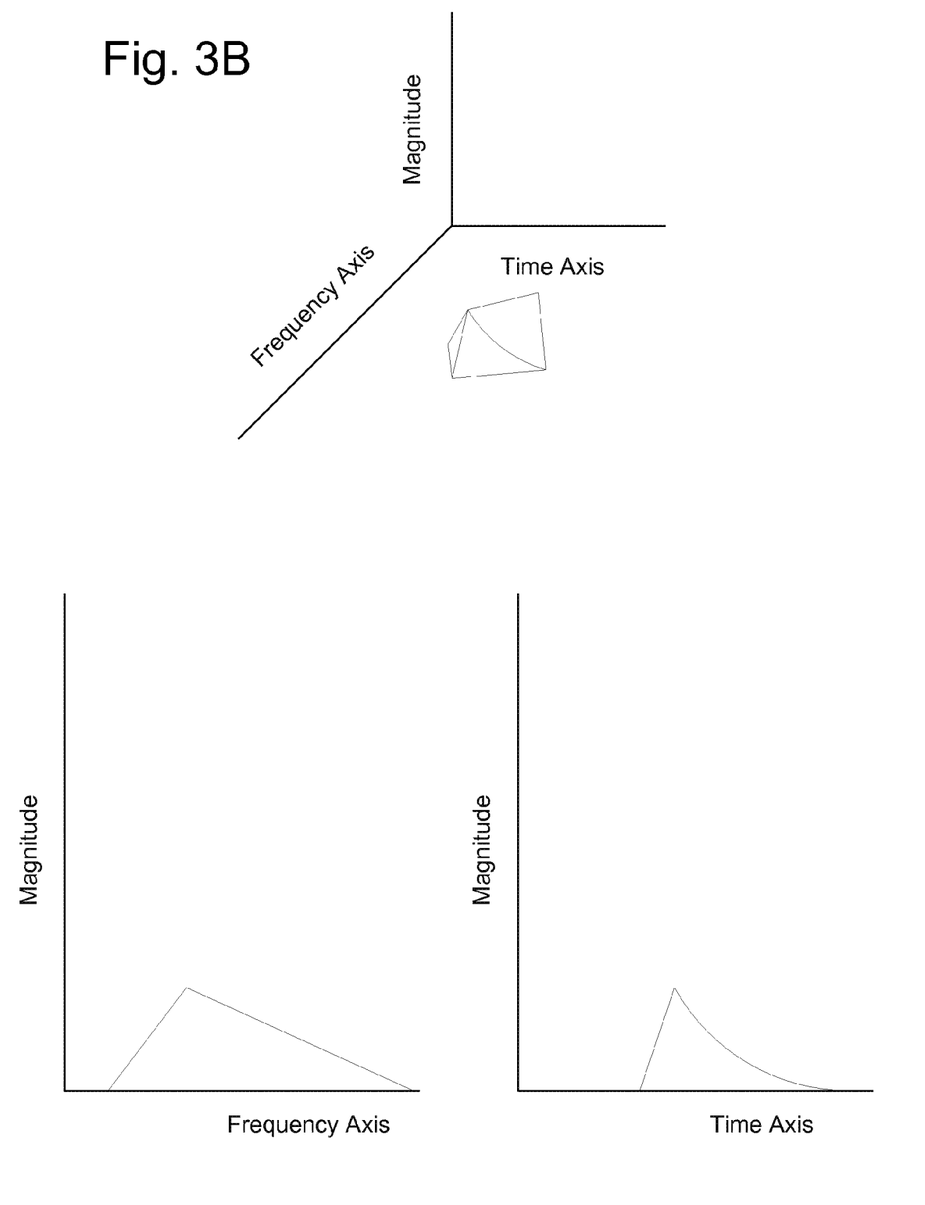
FIG. 3B illustrates a perceptual modeling function that operates on a time-frequency representation of a media signal.

For a PN based watermark signal, both the modeling function for the spreading effect and the modeling function for the temporal masking effect may be combined into a single masking function that models the signal in both the time and frequency dimensions of the spectrogram simultaneously as depicted in FIG. 3B. This modeling function is implemented as a filter applied to the time-frequency representation of a signal to compute an array (e.g., a time frequency mask) of masking control values that modulate the strength of a watermark signal, such as a spread spectrum carrier signal (a PN sequence in the time frequency domain or 2D array modulated with an auxiliary message). To show both the simultaneous and non-simultaneous masking attributes of the filter, the top drawing in FIG. 3B shows a three dimensional perspective (magnitude vs. time vs. frequency) of the filter, and the bottom drawings show the filter from magnitude vs. frequency and magnitude vs. time views.

The filtering is implemented in stages for a PN based watermark: 1) a first stage measures the noise attributes throughout the time frequency representation of the signal to compute an initial array of gain values; 2) a second stage applies the perceptual modeling function shown in FIG. 3B (e.g., by convolution) to modulate the gain values based on the simultaneous and non-simultaneous masking capabilities; and 3) a third stage adjusts the gain values to account for the absolute hearing threshold.

As an alternative, the modeling function may be used to identify samples or groups of samples within the time frequency information that have masking capabilities suitable to hide a watermark. In this case, the masking control values are used to determine where to apply a watermark embedding function to samples in the spectrogram. For example, the modeling function may identify noisy areas and/or edges in the time or frequency dimensions that are good masker candidates for hiding a watermark signal produced by a particular watermark embedding function. A vertical edge in the spectrogram (where frequency is along the vertical axes and time along the horizontal), for instance, provides a masking opportunity for a watermark embedded along that edge. A horizontal edge, in contrast, may be a poor candidate since it indicates a consistent tone over time that is less likely to hide certain types of watermark signals.

While vertical edges provide masking opportunities in some cases, watermarks applied over certain types of transients in the temporal domain of an audio signal may be audible. As such, the watermark encoder identifies these sensitive transients and excludes or reduces the watermark signal around them.

In addition to information provided from perceptual modeling, the watermark encoder also uses other criteria for determining the location and strength of the watermark signal. One criterion is robustness to typical transformations. For example, an audio watermark may be embedded so as to survive transformations due to television or radio broadcast, digital bit rate compression (such as MPEG audio coding like MP3 or AAC), equalization, normalization, digital to analog conversion, ambient room transmission, and analog to digital conversion. To make the watermark robust, the encoder may apply the watermark in frequency ranges (e.g., 200 Hz to 5 kHz) where it is more likely to survive these types of transformations.

A watermark process that operates in the time-frequency domain will first be described with reference to FIG. 4. Following this description, a more detailed example will be provided with reference to FIG. 5.

Figure 4A:
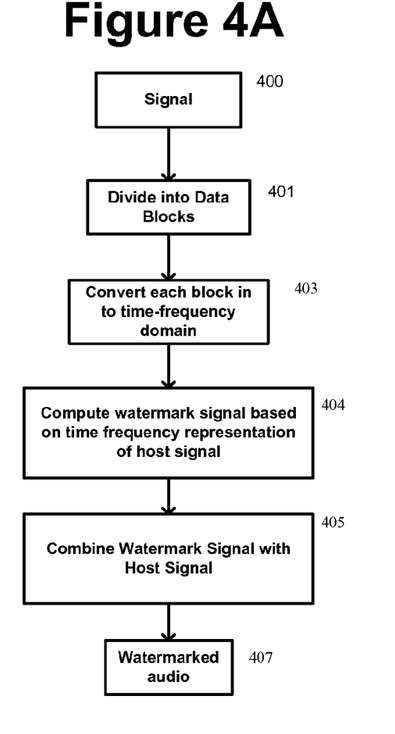
FIG. 4A is a generalized flow diagram of a process for computing a watermark in a time-frequency domain of a media signal and embedding the watermark in the media signal.

An example of time-frequency domain watermarking is outlined in FIG. 4A. The signal 400 is divided into blocks, as shown in step 401. Next, each block is converted into the time-frequency domain, as shown in step 403. For example, the FFT (Fast Fourier Transform) is applied to overlapping or non-overlapping segments within a block. These segments vary in length depending on the application. In this particular implementation, the segments are about twenty milliseconds long. Three such segments are indicated by the lines B, C, and D in FIG. 1. These segments are created with a Hamming or similar window to reduce windowing effects on the frequency transformation.

Then, a watermark signal is computed from the time frequency representation as shown in step 404. Depending on the nature of the watermark signal, this process may incorporate perceptual masking analyses described above.

In some applications, the watermark signal is formed, at least in part, from an auxiliary message comprising a set of symbols, such as binary or M-ary symbol sequence. Some of these symbols may be fixed to assist in locating the watermark signal in a suspect signal (e.g., a fixed message start or end code or other synchronization or calibration codes). Others may carry additional information such as one or more numeric or alphanumeric messages, instructions, control flags, etc. To make the message signal more robust to manipulation, it may be repeated, error correction encoded and spread spectrum modulated. Examples of error correction coding schemes include BCH, convolution codes, turbo codes, Reed Solomon codes, etc. Other forms of symbol encoding may be used as well such as M sequences and gold sequences.

A binary or M-ary message signal can be spread spectrum modulated by spreading it over a pseudorandom number. The pseudorandom number acts as a carrier of the message signal. In particular, a binary antipodal message signal can be spread over a pseudorandom number by repeating the message signal and multiplying it by a pseudorandom antipodal signal. The result is a pseudorandom, binary antipodal signal that carries the message. A similar spread spectrum modulated message signal can be computed by modulating a binary message signal with a pseudorandom sequence using an XOR operator.

As part of the process of computing the watermark signal (404), the encoder transforms the message signal into a watermark signal. It then combines the watermark signal with the host signal as shown in step 405. The process of combining the watermark signal may be performed in the time-frequency domain, the time domain, or some other transform domain. For example, the encoder may compute the watermark signal in the time frequency domain, transform it into the time domain, and then add the time domain watermark signal to the host signal. Alternatively, the encoder may embed the watermark signal into the time frequency representation of the host signal and transform the result into the time domain to produce the watermarked signal.

The manner in which the watermark signal is combined with the host audio signal depends on the details of the embedding function, and any perceptual masking methods incorporated into the embedding process. Preferably, the encoder performs a perceptual masking analysis of the time frequency signal, and uses the result of this masking analysis to control the process of embedding the message signal in the host signal.

To illustrate the embedding process in the time frequency domain, it is helpful to consider some examples. In one implementation, a time frequency domain perceptual mask is derived from the time frequency representation of the host audio signal by passing a filter over the time frequency representation of the host signal as described above. The perceptual mask comprises an array of gain values in the time frequency domain. The encoder generates the time frequency representation of the message signal by mapping the spread spectrum modulated message signal to sample locations in the time frequency domain. The perceptual mask is then applied to (multiplied by) corresponding binary antipodal elements in the time frequency representation of the message signal to form a watermark signal.

Next, the time frequency representation of the watermark signal is converted to the time domain by performing an inverse transform from the time frequency domain to the time domain.

Finally, the time domain watermark signal is added to the original host audio signal, as shown in step 405. The result is the watermarked signal 407.

In another implementation, the encoder embeds the watermark signal by modulating peaks in the time frequency representation of the host signal. The encoder first identifies peaks within a given time frequency range of a block of audio. A binary message signal is then encoded around the N largest peaks as follows.

A peak sample in the time frequency domain is represented as the variable x, neighboring time-frequency samples at consecutive times after x in the time dimension are a and b, and neighboring samples at consecutively higher frequencies in the frequency dimension are c and d. The encoder modulates the peak so that:

$$a = b + \frac{3x - b}{4}$$

and $$c = d + \frac{3x - d}{4}$$

to encode a one; and $$a = b + \frac{x - b}{4}$$

and $$c = d + \frac{x - d}{4}$$

to encode a zero. To read message, the decoder converts the watermarked signal to the time frequency domain, identifies the N largest peaks and computes the message values as follows.

$$a > b + \frac{x - b}{2}$$

and $$c > d + \frac{x - d}{2}$$

to decode a one; and $$a < b + \frac{x - b}{2}$$

and $$c < d + \frac{x - d}{2}$$

to decode a zero. As a variation, the encoder may modulate additional neighboring samples (than just c and d) around the peak to encode a message symbol.

Another form of peak modulation is to identify the two top peaks in a block of the time frequency representation of the signal and modulate the relative heights of these two peaks. For example, a decrease in the relative peak differences represents a binary 0, which an increase in the relative peak differences represents a binary 1.

In another implementation, the encoder embeds a message by performing echo modulation in the time frequency domain. In particular, the encoder segments a time frequency representation of a block into different frequency bands. In each of these bands, the encoder adds a low amplitude, time-frequency shifted version of the host signal to encode a desired symbol in the message signal. The amount and direction of the shift is a function of a secret encoding key that maps a desired symbol to be encoded to a particular direction and amount of shift. The direction of the shift varies from one band to the next to reduce the chances of false positives, and the shift is represented as a vector with both frequency and time components. The encoder may embed additional message symbols or the same message repeatedly by repeating the process in additional time frequency blocks of the host signal.

To detect the echo modulation, a decoder performs auto correlation of the time frequency block of a watermarked signal. The message symbol is decoded based on the location of an autocorrelation peak in each frequency band.

One variation to this method is to encode message symbols based on the extent of the autocorrelation. In particular, the amount of autocorrelation in a given band or in each of a set of bands of the time frequency representation corresponds to a desired message symbol.

In each of these methods, the encoder computes the watermark based on time frequency information and embeds it in the time frequency domain. In some cases, the encoder transforms a time-frequency watermark signal to the time domain and combines it with the host signal in the time domain. In others, it transforms the watermarked signal from the time frequency domain to the time domain.

To avoid distortion of the signal, the time-frequency transform should have an inverse. For example, certain types of filter banks, such as quadrature mirror filters have inverses. Wavelet transforms also have inverses. Time-frequency transforms based upon windowed Fourier transforms have an inverse computed by performing the inverse FFT on each segment and then adding the segments back together to get a time domain signal. If the segments were non-overlapping, each inverse FFT of each segment connects with the other. If the segments were overlapping, each inverse FFT is overlapped and added appropriately.

Additional operations may be performed to enhance detectability and reduce perceptibility of the watermark signal. The host signal samples in the time frequency domain may have properties that are consistent with the watermark signal, and as such, these samples do not have to be modified as much as samples that are inconsistent with the watermark signal. For example, a binary antipodal watermark signal includes positive and negative values that add or subtract from corresponding samples of the host signal. If a sample or group of samples in the host signal corresponding to a positive watermark signal is already greater than its neighbors, then the host signal need not be changed or may be changed less to embed the positive watermark signal element. This same perceptual modeling technique applies to other forms of watermark signals, such as those that modulate peaks or edges of the time frequency representation, add echoes or modulate other statistical features of the host signal. In general, the gain values of the perceptual mask (or the corresponding watermark values) may be adjusted based on the extent to which the host signal properties are consistent with the watermark signal properties.

Another enhancement to improve the watermark encoder is to embed the watermark in a manner that changes the host signal in a way that is distinguishable from typical manipulation of the watermarked signal. For example, if the embedding process adds a modulated noise signal or echo, it should do so in a manner that is distinct from the noise or echo signals introduced through normal processing such as compression, D/A or A/D conversion, ambient room transmission, broadcast, etc. Naturally occurring echoes can be distinct from a synthetic echo by giving the synthetic echo properties that are unlikely or impossible to occur naturally (e.g., make the synthetic echo have different time delays relative to the host signal in different frequency bands).

Figure 4B:
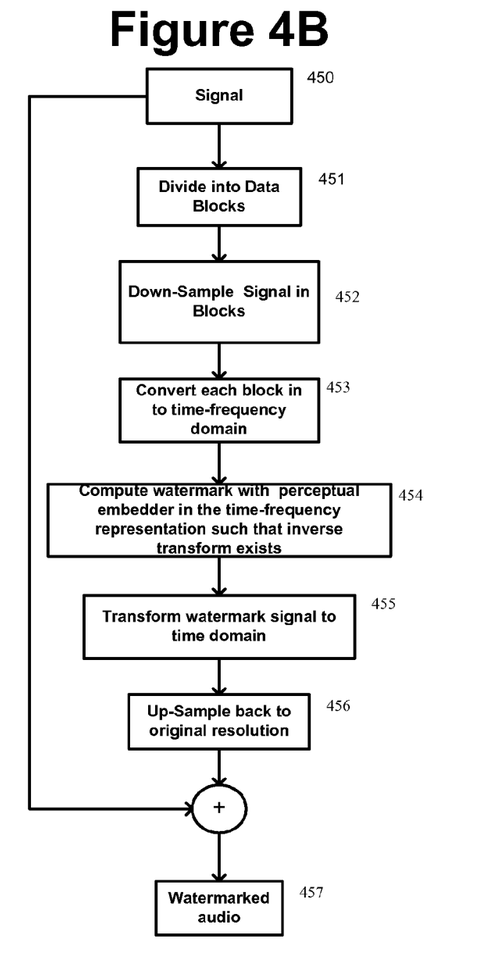
FIG. 4B is another flow diagram of a process for computing a watermark in a time-frequency domain of a media signal and embedding the watermark in the media signal.

FIG. 4B shows a related embedding process. This alternative is efficient for embedding a watermark in a limited frequency range. The process is similar to that of FIG. 4A, except that it includes down-sampling, as shown in step 452, and up-sampling, as shown in step 456. Every step in FIG. 4A has a similar step in 4B with the step number shifted by 50 (i.e. 403 is 453). Thus, the discussion is focused on the new steps 452 and 456

The down-sampling and up-sampling allow the watermark to be computed using a portion of the host signal. The portion can be selected such that the watermark will be more robust and/or less perceptual, e.g., selecting a designated mid-range frequency band to encode the watermark signal. The encoder can perform pre-filtering operations, such as down/up sampling, band pass filtering, etc., to select a portion of the host signal for perceptual analysis and watermark embedding before or after the time-frequency transformation.

The down-sampling step 452 includes application of an anti-aliasing filter. The anti-aliasing filter ensures that the signal has a bandwidth half of the sampling rate after the down-sampling step. The anti-aliasing filter may use a low-pass filter, or a band-pass filter to limit the watermark to a specific frequency range of the host signal. In this document, "d" represents an integer parameter that indicates the amount of down-sampling. For example if "d" is 4 and the audio signal is at a sampling rate of 44.1 kHz (which is a typical audio CD sampling rate), the signal is down-sampled to 11.025 kHz.

The up-sampling step 456 may be implemented using a variety of methods. One method is to insert zeros between data points and filtering with a high-order low-pass filter with the cutoff frequency at half the final sampling rate. It can also include first order interpolation, or, for a more accurate representation, it can include convolving the signal with the sinc $(\sin(x)/x)$ function to create new points.

The down-sampling and up-sampling result in a transformed and possibly degraded audio signal, so it is preferred to compute and add the watermark back to the original audio signal, as shown in step 455.

Finally, the time domain watermark signal is added back to the original audio signal 450, which results in a watermarked signal 457.

Figure 4C:
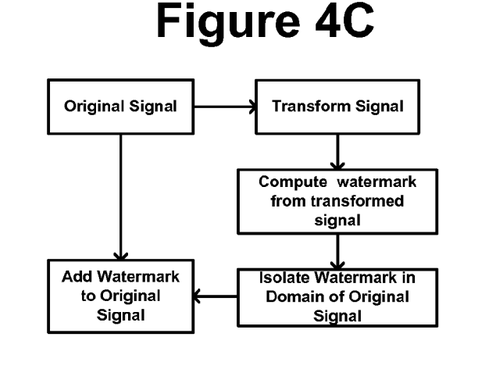
FIG. 4C is a flow diagram illustrating features of FIG. 4B and FIG. 5A.

Certain generally applicable features of the process shown in FIG. 4B are summarized in FIG. 4C. These features include computing the watermark from a transformed version of the host signal and adding it back to the host signal in its original domain. Note that this process is applicable to a variety of content types, such as images, audio and video. These basic steps are also reflected in FIG. 5A, which shows an example implementation of a time-frequency watermark encoder.

Figure 4D:
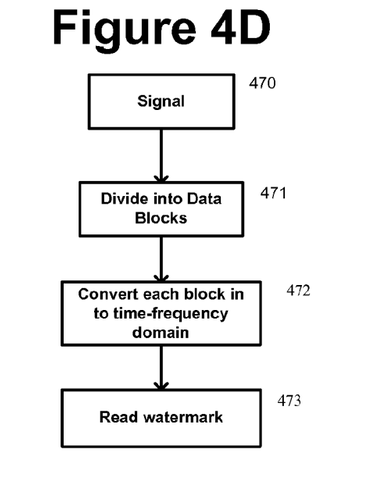
FIG. 4D is a generalized flow diagram of decoding a time-frequency watermark in an audio signal.

FIG. 4D shows an example of a watermark reader compatible with the embedder technology described above. Reading begins with converting the audio signal 470 into blocks, as shown in step 471. Each block is converted into the time-frequency domain, as shown in step 472. From the frequency domain the watermark is read, as shown in step 473.

The specific details of the watermark reading process depend on the embedding function. In one implementation, the watermark is computed as a perceptually adapted, pseudorandom antipodal signal with elements that increase or decrease corresponding samples in the time-frequency domain. First, the watermark decoder detects the presence of the watermark signal in a signal suspected of containing a watermark. One way to detect the watermark is to perform correlation between a known property of the watermark, such as the pseudorandom carrier signal used to spread spectrum modulate the message. If the watermarked signal is likely to be corrupted, such as by time or frequency scaling or shifting, a calibration signal may be used to detect it and compensate for the corruption.

For more information about watermark embedding, detecting (including synchronization) and reading, see U.S. Pat. Nos. 5,862,260 and 6,614,914.

Figure 5A:
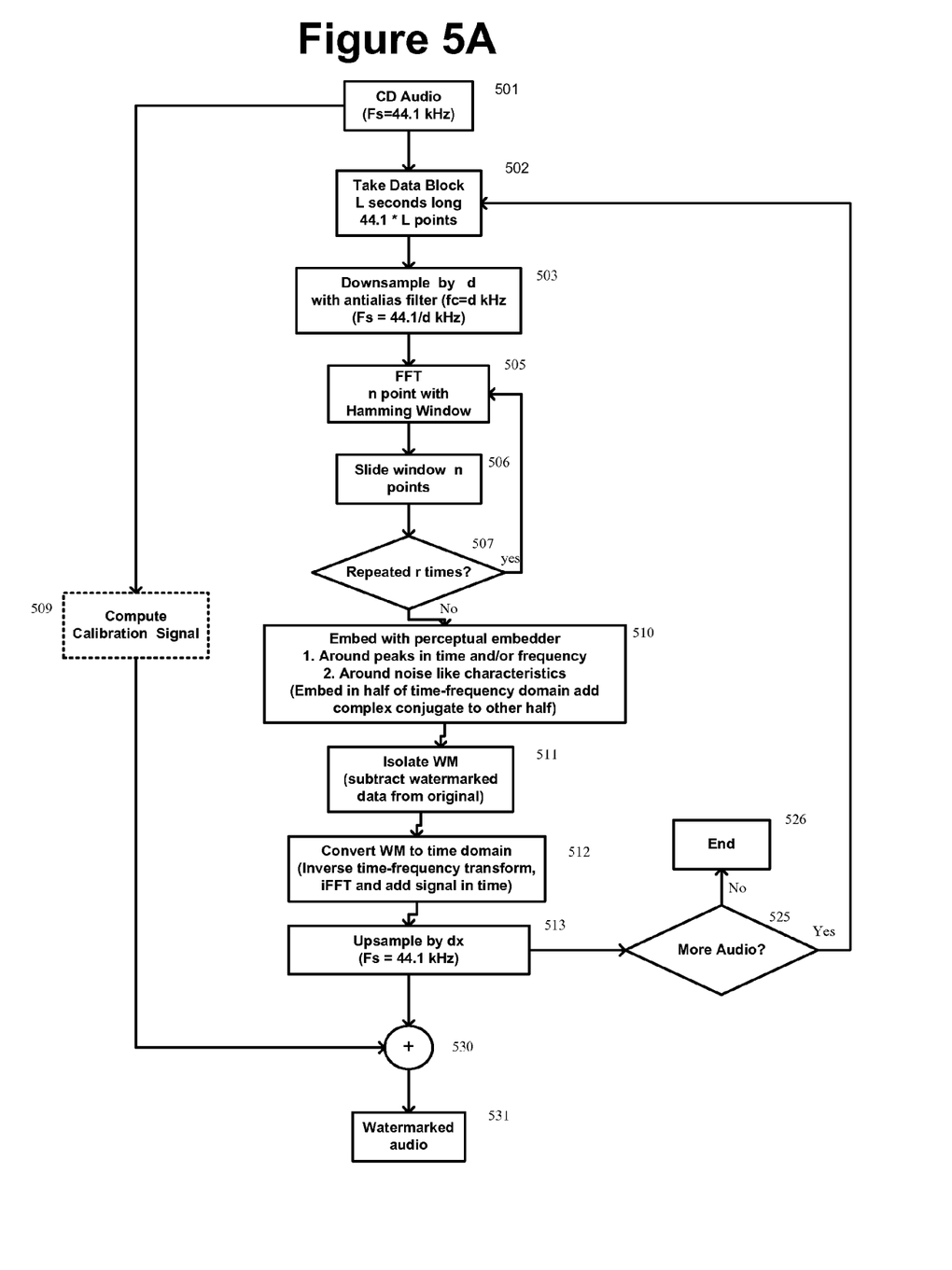
FIG. 5A is a more detailed diagram of watermarking an audio signal in the time-frequency domain.

FIG. 5A is a diagram illustrating a time-frequency domain watermark embedding process for an audio signal. In this embodiment, the original signal is in the form of 44.1 kHz CD audio (501). The first step (indicated by block 502) divides the audio into segments each "L" seconds long. Each segment, therefore, has (44100 times "L") data points.

As indicated by block 503, each segment is down-sampled by an integer value "d" thereby creating a signal at (44.1 divided by "d") kHz signal.

Blocks 505, 506 and 507 indicate that a Hamming widow of width "w" is moved along the data and an FFT with "w" points is applied to each set of "w" points as the window is moved along the data. The FFT is applied "r" times where "r" is one half of "w". A FFT generates a signal that includes a complex conjugate signal. The watermark embedding function should retain complex conjugate symmetry.

The process depicted in blocks 505, 506 and 507 result in a time-frequency representation of the signal (similar to blocks 403 or 453), which has dimensions of "r" times "r".

The length of the segment chosen, the width of the FFT, the size of the resulting time-frequency representation, and the downsizing parameter "d" are matters of engineering design, and they can be chosen to meet the needs of a particular application; however, these parameters are related. They satisfy the following equation:

$$44100*L = r*d*n$$

Next, as indicated by block 510, the watermark data is computed in the time-frequency domain using a perceptually adaptive watermarking process. In one implementation, the encoder computes and embeds the watermark signal by identifying and then modulating peaks in the time-frequency domain to encode binary message symbols. Specific examples of these peak modulation embedding functions are described above.

In another implementation, the encoder computes a time frequency domain watermark signal by adapting a binary anti-podal pseudorandom message signal to the time frequency representation of the host signal. In particular, the encoder generates the message signal by spread spectrum modulating an error correction encoded message with a pseudorandom number. The resulting signal is anti-podal (e.g., 1 represented as a positive number, and 0 represented as a negative number) and is mapped to sample locations in the time frequency representation of the host signal. The encoder adapts the message signal to the host signal by computing a perceptual mask as explained above. The encoder convolves a perceptual analysis filter over the time frequency representation to compute the perceptual mask. This analysis takes into account a measure of the noise attributes and the simultaneous and non-simultaneous masking attributes of the time-frequency signal to create an array of gain values and adjusts the gain values based on the absolute hearing threshold. It then multiplies the gain values by corresponding elements in the message signal to compute a perceptually adapted, time frequency watermark signal.

A further enhancement of the perceptual mask is to adjust the gain values based on whether the host signal sample value or values corresponding to a watermark message signal element have values that are consistent with the message element to be encoded. If they are already consistent, the gain can be reduced; otherwise the gain can be increased to increase the detectability of the watermark signal.

Next as indicated by block 511, the watermark signal is converted to a time domain signal. If the watermark signal is already embedded in the time frequency representation of the host signal, it can be calculated by taking the difference between marked and unmarked signals. One way is to accomplish this to subtract the un-marked but down-sampled signal (just before block 510) from the watermarked signal in the time-frequency domain and then convert the resulting watermark into the time domain. Another way is to convert both the un-marked but down-sampled signal (just before block 510) and the combined signal into the time domain, and then find the difference. The watermark signal is then up-sampled as indicated by block 513. As indicated by blocks 525 and 526, the process is repeated until all the segments have been processed.

As indicated by block 530, the resulting watermark signal is added to the original audio signal 531.

A calibration signal (also referred to as a synchronization signal) can be embedded before or after embedding a message signal, or as part of the process of embedding the message signal into the original audio. The calibration signal is used to align the blocks between the reader and embedder, as shown in step 509. In one embodiment, the calibration signal comprises a set of impulse functions in the frequency domain. In particular, the impulse functions have peaks at known frequencies in the Fourier magnitude domain. The calibration signal may be perceptually adapted to the host signal by applying the perceptual mask described previously.

The calibration signal may be defined in the time-frequency domain. For example, the impulse functions can be set at known frequencies and times in a time-frequency representation. To detect the calibration signal, the decoder performs correlation between the known calibration signal and the watermarked signal in the time, time-frequency, or frequency domains (or some transform of these domains, such as log, or log-log sampling).

Figure 5B:
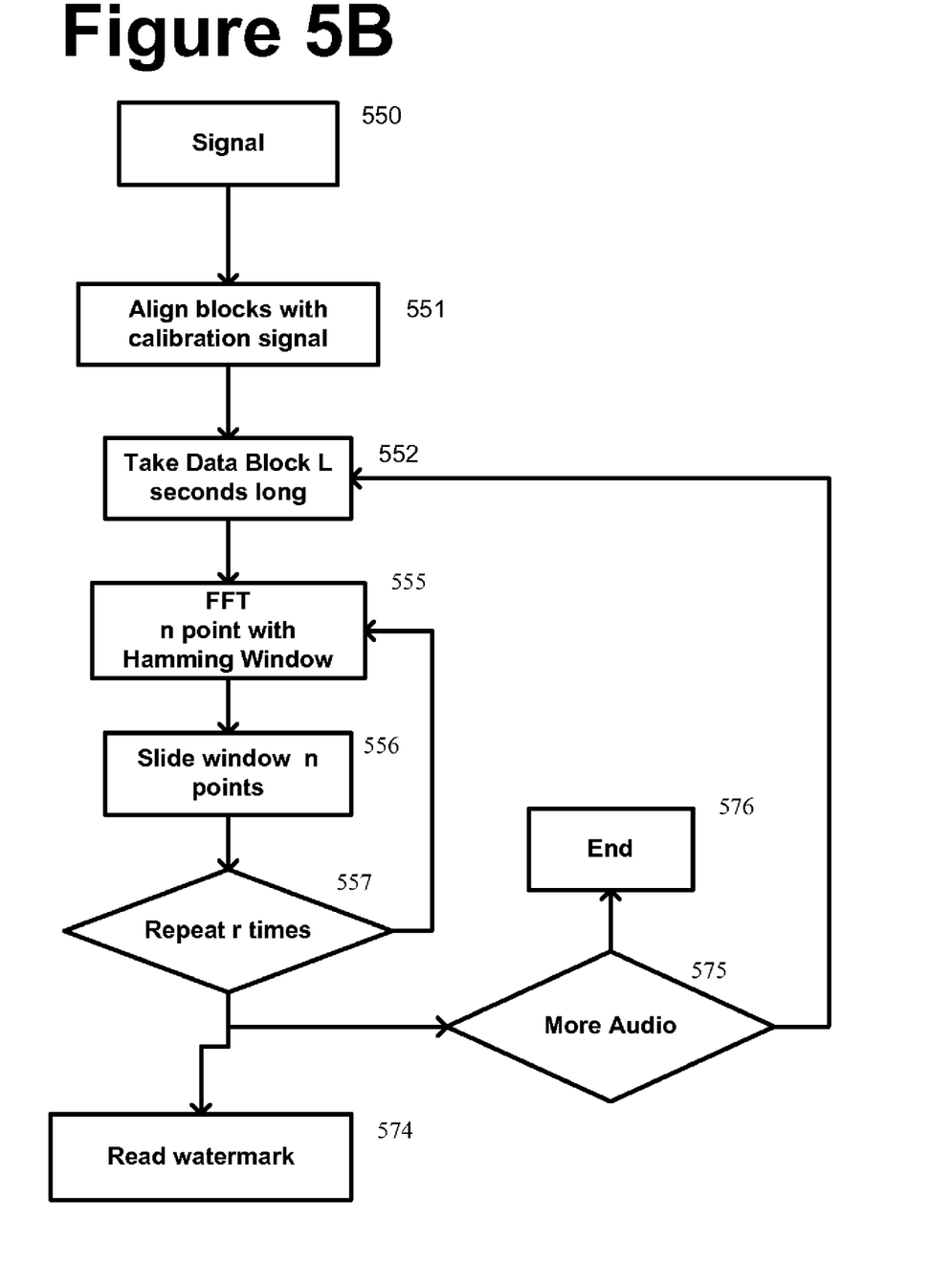
FIG. 5B is a more detailed diagram of decoding a watermark from an audio signal in the time-frequency domain.

FIG. 5B shows the process for decoding a watermark from an audio signal.

Optionally, the watermark decoder begins by detecting the watermark and determining its location and scale using a calibration signal. In video signals, this signal is used to determine the scaling and orientation of the watermarked signal after watermark embedding. In audio signals, this signal can be used to determine time and frequency scaling and align the blocks in the reader for decoding the embedded message, as shown in step 551.

One form of a calibration signal is a signal with known peaks in the magnitude versus frequency (or Fourier) domain with random phase. The location of the peaks can be used to determine the correct sampling rate and compensate for time scaling distortion. The decoder can detect the calibration signal in the marked signal by correlating the marked signal with a reference calibration signal. The point of maximum correlation provides the correct block alignment. The decoder can perform this detection operation in the time domain using cross-correlation, in the frequency domain using convolution, or in some other transform domain or projection of the watermarked signal, such as a log or log-log re-sampling of the signal.

A log or log-log resampling simplifies detection operations. For example, a log sampling of a watermarked signal converts scaling in the pre-sampled signal dimension to a translation or shift in the post-sampled dimension. This enables the decoder to use correlation methods such as generalized matched filters to compute the scaling distortion in the post-sampled dimension.

In cases where the calibration signal is embedded in the time-frequency domain, the system first finds the scaling factor in the time-frequency domain. Then, after re-sampling, the system finds the correct alignment (i.e. offset of the blocks from the beginning of the audio signal) from the time-frequency domain. After it finds the correct alignment, the decoder re-aligns itself and starts reading the embedded message.

The decoder periodically checks scaling and alignment, i.e. every 10 seconds or so, to check for drift.

In order to read an embedded message from an audio signal, the signal is divided into blocks of L seconds long, as shown in step 552. These segments are then transformed into the time frequency domain, as shown in steps 555, 556, 557. A message decoder is then be used to read the watermark, as shown in steps 574. The decoder operates on the remaining audio similarly, as shown in steps 575, 576 and 552.

The implementation of the watermark message reader depends on the embedding function. The message reader is compatible with the embedding function used in the encoder and any symbol coding processes applied to the embedded message. If the embedding function modulates peaks to encode a binary message, than the reader evaluates peaks in the time-frequency representation to extract the message signal estimates. Examples of decoding a peak modulation watermark are provided above.

If the embedding function modulates sample values with a binary anti-podal signal as described previously, then the reader analyzes the time frequency values to estimate the polarity of the watermark signal at selected locations in the time frequency representation corresponding to each message signal element. The polarity provides an estimate of message signal element, which may be aggregated with other estimates to more accurately decode the embedded message. The reader calculates the polarity of each watermark signal element by performing predictive filtering on the time frequency samples to estimate the original, un-watermarked signal in the time frequency domain. It subtracts the estimate of the original signal, and the polarity of the difference signal indicates whether the watermark added or subtracted (encoded a binary 1 or 0, respectively) to the host signal in the time frequency domain.

One form of predictive filtering is to compute for each time frequency sample expected to be encoded a local average of samples in a surrounding neighborhood. This local average provides an estimate of the original sample value, which is then subtracted to compute a difference signal. The difference signal should approximate the watermark signal.

Note that while predictive filtering enhances decoding, it is not required. A PN based antipodal watermark signal can be decoded by correlating the time frequency representation of the watermarked signal with the PN carrier signal that was modulated with message data.

The decoder performs spread spectrum demodulation and error correction decoding to the message signal estimates to decode the embedded message.

The remaining audio may have the same data as each other block repeated throughout the audio, such as a unique ID per song, or contain new data, such as the lyrics. The ID may be repeatedly spread over several blocks.

Other methods of watermarking the audio data in the time frequency domain are also possible. One could modulate the statistical features of the waveform, such as echos or energy windows, use least significant bit replacement, or modulate waveform heights (see U.S. Pat. No. 7,197,156).

As noted above, the watermark encoder could embed a watermark using a copy of the signal with much lower amplitude and slightly shifted in the time-frequency domain to encode bits. These shifts can be thought of as low magnitude echoes with shifted frequency and/or time. This type of encoder embeds data by predefining one specific shift as a "1" and another specific shift as a "0". The amount of time and the angle of shift can be used to encode data bits, and thus transmit hidden information. Specifically, a shift of 45 degrees down and back consisting of 5 previous time points and 5 lower frequency points could be a "1", whereas a shift of 45 degrees up and forward consisting of 5 future time points and 5 higher frequency points could be a "0". The data could be read using a two dimensional autocorrelation or any other existing method of two dimensional shift (i.e. echo) calculation.

More specifically, the feature could be modulated differently in specific regions of the time frequency domain such that a room or broadcast could never simulate the feature. For example, the 5 point 45 degree shift discussed above could be used in a up and forward direction below 1 kHz and down and back above 1 kHz to represent a "1", and the inverse signal could be used to represent a "0".

Finally, for synchronization of the watermark decoder, the watermark system can define a specific feature that represents a synchronization signal and is used to determine the beginning of a message or used to break a message into frames. This is in addition to or as an alternative to using a specific payload, such as "1 0 1 0 1 0 1 0" to represent this synchronization (a message symbol or set of symbols that signals the presence, start or end of a watermark signal). For example, echoes purely in time could be used for the message data and echoes purely in frequency could be used for synchronization.

Also, a time domain, low amplitude PN signal could be used to determine the temporal location of a watermark signal as well as the time scale modifications of the watermarked audio signal since being encoded with the watermark. In the decoder, a watermark detector uses this PN signal to detect a watermark and to determine the shift (temporal location, or origin) and time scale of the watermark. In particular, it performs a correlation between the PN signal and the watermarked signal. The decoder uses the location and time scale that provides a maximum correlation to align the watermarked data before performing message decoding operations (such as transforming to the time frequency domain and extracting an embedded message).

Other watermark systems can be used to encode and decode the watermark. For example, watermark systems that apply to two dimensional signals, like image signals, can be applied to the two dimensional time-frequency representation of the audio signal to encode and decode watermark signals. Watermark systems described in U.S. Pat. Nos. 5,862,260 and 6,614,914 can be applied to encode and decode watermark signals from the time-frequency representations of audio and video.

Figure 6:
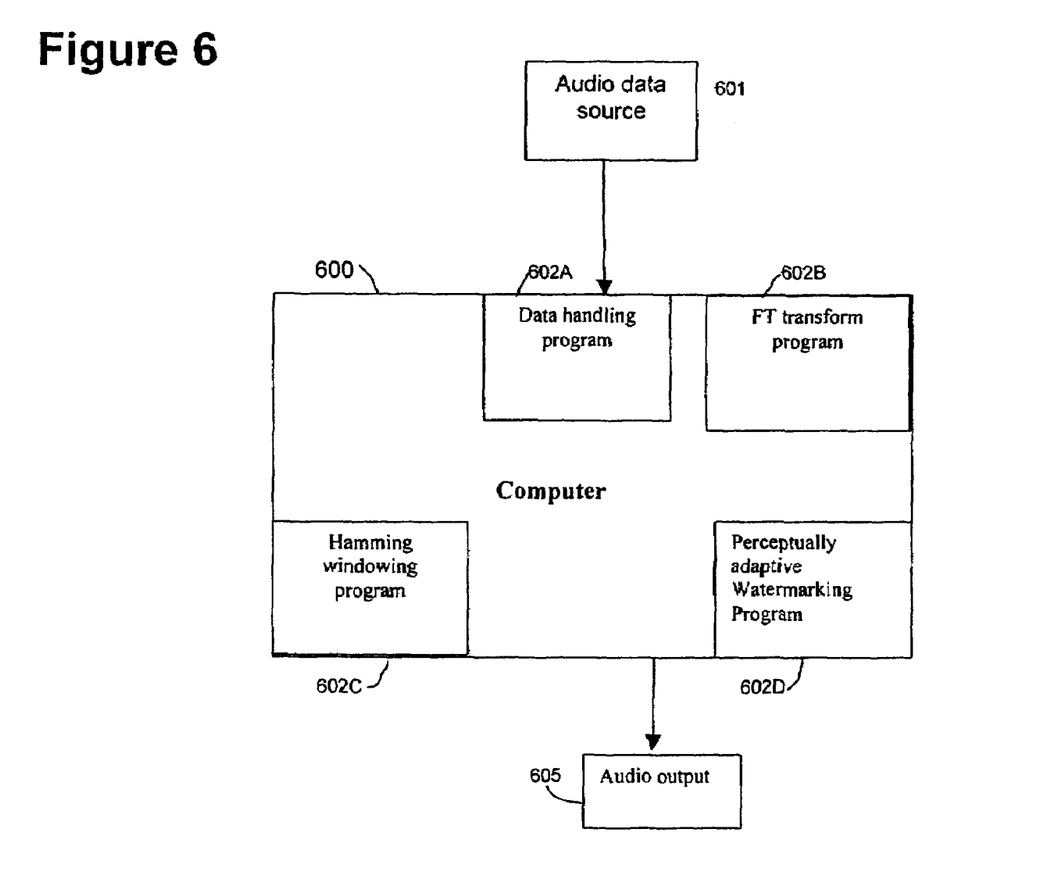
FIG. 6 is a diagram of a system for implementing the time-frequency based watermarking.

FIG. 6 shows a system for implementing an embodiment of the invention. An audio input source 601 provides audio data to a data handling program 602A in computer 600 (e.g., Personal Computer, Personal Digital Assistant, Phone, Set-top box, audio player, video player or other device with processing logic and memory). A FFT program 602B performs the steps shown in block 505 of FIG. 5. A perceptively adaptive watermarking program 602D performs the actions shown in block 510 in FIG. 5. A Hamming windowing program 602C performs the Hamming windowing function of blocks 505 and 506 in FIG. 5. After embedding the watermark, the system provides a watermarked signal output 605. For watermark decoding operations, the system may also be equipped with a watermark decoding program.

CONCLUDING REMARKS

The watermarking systems described above can be used to embed auxiliary information, including control instructions, metadata, or links to metadata and instructions, in audio, video, or combined audio and video signals. For related information on such applications for using watermarks to link watermarked content to information or actions, see U.S. Pat. Nos. 5,841,978, 6,947,571, 6,505,160 and U.S. application Ser. No. 09/574,726.

The methods, processes, and systems described above may be implemented in hardware, software or a combination of hardware and software. For example, the watermark encoding processes may be implemented in a programmable computer or a special purpose digital circuit. Similarly, watermark decoding may be implemented in software, firmware, hardware, or combinations of software, firmware and hardware. The methods and processes described above may be implemented in programs executed from a system's memory (a computer readable medium, such as an electronic, optical or magnetic storage device).

While the invention has been shown and described as applied to media signals with temporal components like audio and video signals, a process of down-sampling to facilitate the application of a relatively small and efficient transform could be applied to a other types of media signals such as still images, graphics, etc.

To provide a comprehensive disclosure without unduly lengthening the specification, applicants incorporate by reference the patents and patent applications referenced above. The particular combinations of elements and features in the above-detailed embodiments are exemplary only; the interchanging and substitution of these teachings with other teachings in this and the incorporated-by-reference patents/applications are also contemplated.

While the invention has been shown and described with respect to preferred embodiments thereof, it should be understood that various changes in form a and detail can be made without departing from the spirit and scope of the invention.

We claim:

1. A method of watermarking an electronic audio signal, the method comprising:
    performing frequency transformations of blocks of the electronic audio signal to produce frequency domain representations of the blocks;
    forming a two dimensional representation of the electronic audio signal from the frequency domain representations;
    providing an auxiliary data signal to be embedded in the electronic audio signal; and
    modifying the two dimensional representation of the electronic audio signal according to the auxiliary data signal to embed the auxiliary data signal in the electronic audio signal.

2. The method of claim 1 wherein the modifying includes computing changes to the electronic audio signal to encode the auxiliary data based on the two dimensional representation of the electronic audio signal that includes both time and frequency dimensions.

3. The method of claim 1 wherein the modifying includes performing a two dimensional transformation of the two dimensional representation of the electronic audio signal.

4. The method of claim 3 wherein the two dimensional transformation is dependent on the auxiliary data signal to be embedded in the electronic audio signal.

5. The method of claim 1 wherein the modifying includes varying a function used to represent a message symbol of the auxiliary data with frequency, such that the same message symbol is represented differently at different frequencies.

6. The method of claim 5 wherein varying includes varying a direction of a modulation of the two dimensional representation.

7. The method of claim 1 wherein the modifying comprises modifying regions in the two dimensional representation to correspond to elements of the auxiliary data.

8. The method of claim 7 wherein the modifying the regions comprises setting values within the regions to correspond to elements of the auxiliary data, the values being set in a signal dependent manner.

9. The method of claim 1 wherein the modifying includes computing a modification from the two dimensional representation and applying the computed modification to the electronic audio signal in a different domain.

10. The method of claim 9 wherein the different domain comprises a frequency domain of the electronic audio signal.

11. The method of claim 9 wherein the different domain comprises a time domain of the electronic audio signal.

12. A method of watermarking an electronic audio signal, the method comprising:
    performing frequency transformations of blocks of the electronic audio signal to produce frequency domain representations of the blocks;
    forming a two dimensional representation of the electronic audio signal from the frequency domain representations;
    providing an auxiliary data signal to be embedded in the electronic audio signal; and
    from the two dimensional representation of the electronic audio signal, deriving modifications of the electronic audio signal that correspond to the auxiliary data signal and applying the modifications to the audio signal to embed the auxiliary data signal in the electronic audio signal.

13. A computer readable medium on which is stored instructions, which, when executed by a computer, perform a method of watermarking an audio signal, the method comprising:
    performing frequency transformations of blocks of audio to produce frequency domain representations of the blocks;
    forming a two dimensional representation of the audio from the frequency domain representations;
    providing an auxiliary data signal to be embedded in the audio signal; and
    modifying the two dimensional representation of the audio according to the auxiliary data signal to embed the auxiliary data signal in the audio signal.

14. A method of decoding an auxiliary data signal from an electronic audio signal, the method comprising:
    performing frequency transformations of blocks of the electronic audio signal to produce frequency domain representations of the blocks;
    forming a two dimensional representation of the electronic audio signal from the frequency domain representations;
    analyzing the two dimensional representation of the electronic audio signal to ascertain modifications made to encode the auxiliary data signal; and
    reading the auxiliary data signal from the modifications.

15. A computer readable medium on which is stored instructions, which, when executed by a computer, perform a method of decoding an auxiliary data signal from an audio signal, the method comprising:

performing frequency transformations of blocks of audio to produce frequency domain representations of the blocks;

forming a two dimensional representation of the audio from the frequency domain representations;

analyzing the two dimensional representation of the audio signal to ascertain modifications made to encode the auxiliary data signal; and reading the auxiliary data signal from the modifications.

16. The method of claim 1: including using a programmed processor to perform the acts set forth in claim 1.

17. The method of claim 1: including using a special purpose digital circuit to perform the acts set forth in claim 1.

18. The method of claim 12: including using a programmed processor to perform the acts set forth in claim 12.

19. The method of claim 12: including using a special purpose digital circuit to perform the acts set forth in claim 12.

20. The method of claim 14: including using a programmed processor to perform the acts set forth in claim 14.

21. The method of claim 14: including using a special purpose digital circuit to perform the acts set forth in claim 14.

* * * * *